Patented Nov. 24, 1942

2,303,261

UNITED STATES PATENT OFFICE 2,303,261

LUBRICATING SYSTEM

Russell P. Dunmire, Alliance, Ohio, assignor, by mesne assignments, to The Buckeye Laboratories, Inc., a corporation of Ohio Application November 23, 1938, Serial No. 241,959

6 Claims. (Cl. 184—6)

This invention is directed to the lubrication of bearings in a closed system whereby the lubricant passes through the bearings, is treated to remove contaminants such as gases, water, scale and dust therefrom and returned to the bearings again in a closed circuit, thereby preventing deterioration of the lubricant and eliminating bearing failures and stoppage of production.

It has also been shown experimentally and in practice that lubricants processed in the described manner have a marked decrease in internal film friction, thereby effecting a great saving in power input as well as greatly increasing the temperature at which the oil film ruptures.

The process is applicable to all closed lubricating systems as, for example, mill bearing systems, back-up roll bearings, work roll bearings, pinion stand systems, reducing gear drive systems, motor generator sets, drive turbines and generators; in fact, as above stated, the invention is applicable to any bearing lubricating system wherein the lubricant can be circulated in a closed circuit.

Broadly speaking and considered from its broadest aspect, my invention comprehends the circulation of the lubricant in a closed lubricating system while dehydrating and degasifying the lubricant.

More specifically my invention, in addition to dehydrating and degasifying the lubricant, comprehends the filtering and cooling of the lubricant before the same is returned to the bearings.

In one embodiment of my invention the lubricant, which is circulated in a closed system, passes through the bearings to be lubricated and is then returned to a settling tank, a part of the lubricant being continuously withdrawn from this settling tank, dehydrated and degasified and returned to the settling tank, all of the lubricant passing continuously through a filter and cooler and back to the bearings.

In another embodiment of my invention the lubricant is returned from the bearings to a settling tank, and before passing to a filtering and cooling system, all of the lubricant is dehydrated and degasified.

Another embodiment of my invention comprehends the use of two settling tanks. In this embodiment of the invention the lubricant from one settling tank is dehydrated and degasified, the lubricant from the other settling tank is re-refined and all of the lubricant is filtered and cooled and returned to the bearings.

My invention also comprehends the employment of a system similar to that last mentioned in which the re-refining equipment may take the form of an adsorbent filter system.

In all of the embodiments of the invention, the lubricant is circulated under pressure.

Inasmuch as the settling tanks, filters and coolers employed in the practice of my invention may take a variety of forms, I have deemed it advisable in the present application merely to refer to these various devices in a general fashion, the details of these devices constituting the subject matter of other applications.

Accordingly the drawings accompanying this application are in the nature of flow sheets.

Figure 1:
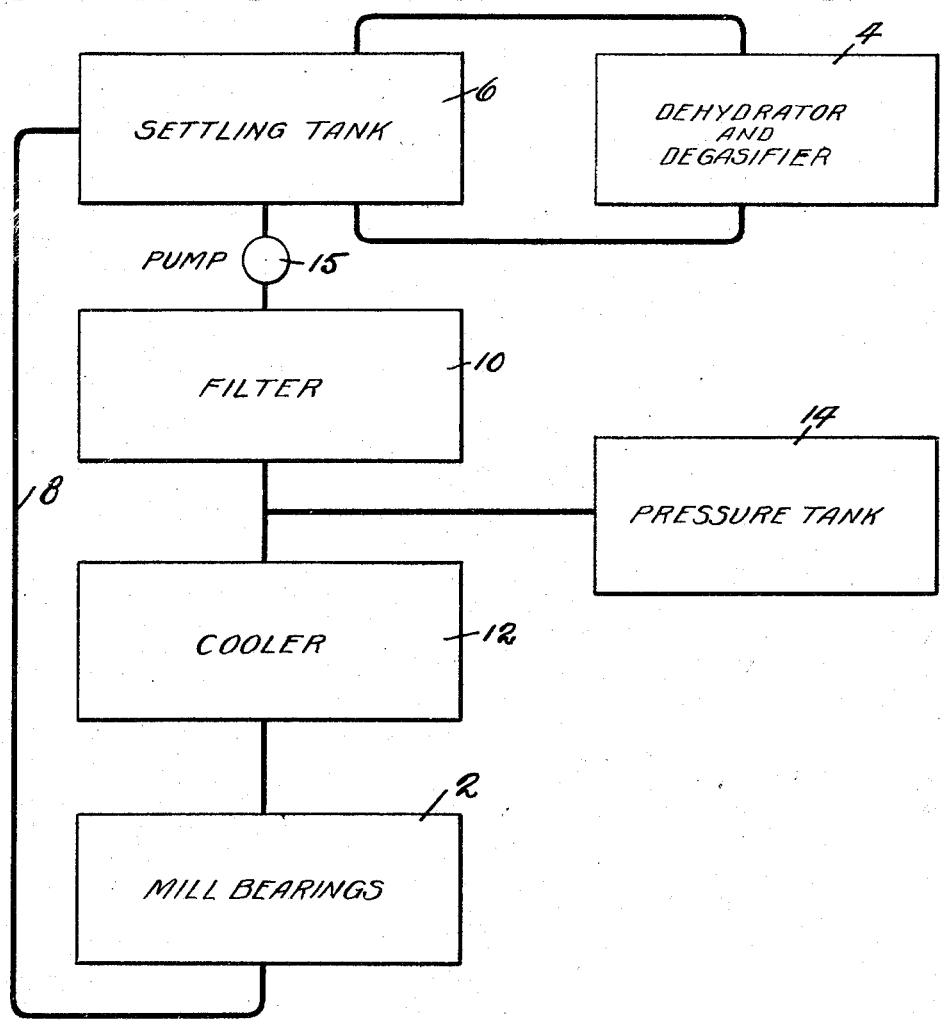
Fig. 1 is a flow sheet of one embodiment of my invention showing a dehydrator and degasifier connected across a settling tank.

Referring to the drawings in detail and first of all to Fig. 1: 2 designates the bearings to be lubricated. As above mentioned, these bearings may be any bearings wherein it is possible to employ a closed lubricating system, that is to say, a system in which the lubricant may be continuously circulated in a closed circuit. Examples of such a bearing, as above noted, are mill bearing systems, back-up roll bearings, work roll bearings, pinion stand systems, reducing gear drive systems, motor generator sets and drive turbines and generators. The system illustrated in the flow sheet of Fig. 1 employs a dehydrator and degasifier designated 4. This dehydrator and degasifier may be of the type such as disclosed, for example, in Rodman and Dunmire Patent No. 1,836,338, dated December 15, 1931.

This dehydrator and degasifier is connected across a settling tank 6. It will be seen from the flow sheet that lubricant from the settling tank 6 is constantly being circulated through the dehydrator and degasifier and returned to the settling tank. The settling tank is connected by a return line 8 to the bearings 2. Connected in series with the settling tank are a filter 10 and a cooler 12 and, as will be seen from the flow sheet, the tank, filter and cooler are all connected in series with the bearings 2. A pressure tank 14 is connected into the line at any suitable point here shown between the filter 10 and cooler 12 to maintain the system under pressure. Circulation of the lubricant is effected by pump 15.

As pointed out in the forepart of this description, the settling tank 6, filter 10 and cooler 12 and for that matter the pressure tank 14 may take different forms and for this reason these equipments will not be described in any detail. It might be well, however, to consider the function of the settling tank 6. This tank functions not only as a reservoir for the storage of large quantities of lubricants but also as a precipitation or settling tank wherein the velocity of the lubricant, which is lighter than water, is reduced to such an extent that water gradually precipitates to the bottom of the tank together with any solid particles such as scale, iron oxides and materials of like nature and inasmuch as in large lubricating systems such as in a steel mill, for instance, where such high rates of flow as 500 gallons per minute is usual, it is desirable to provide the settling tank with baffles and the like as, for example, baffles in the nature of separators so arranged as to increase the length of the path of flow of the lubricant through the settling tank. The baffles may be imperforate or perforate. For example, I may, if desired, employ fine metallic screens for the baffles which facilitates precipitation and enables me at the same time to take advantage of the straining or filtering properties of the screen. I may also employ a construction in the settling tanks wherein I convert turbulent flow to streamline flow which obviously will promote precipitation of contaminants in the lubricant. Various other constructions may be employed in the settling tank but as above mentioned these have not been shown in detail and will not be described in detail, the same constituting the subject matter of other applications.

The filter 10 may also take a number of different forms. In any event, however, the filter will be of a sufficient degree of fineness to filter out very fine particles of solid materials. Such a filter may be of the centrifugal type or it may be composed of glass cloth or glass wool or other substances which are not affected by the oil and which may be readily cleaned by back washing or back flow steam under pressure for purposes of cleaning them. Other filters of any conventional type may also be employed, if desired.

The pressure tank shown at 14 may be of any suitable construction, its function being mainly to maintain the lubricating system under pressure but it will usually be of sufficient capacity to provide for sufficient storage of lubricant for operation of the bearings in the event of failure of the supply pumps. The pressure tank, of course, will be sealed.

It is preferred to maintain the oil under pressure by the use of a hydraulic accumulator of suitable design or a blanket of inert gas over the surface of the oil, thereby preventing deterioration of the oil.

The cooler, shown at 12, may be any commercial type of cooler of which there are many available in the open market.

So far as the system shown in the flow sheet of Fig. 1 is concerned, therefore, it will be seen that the lubricant is continuously being circulated in a closed circuit and under pressure through a settling tank, filter, cooler and the bearings to be lubricated, part of the lubricant continuously being dehydrated and degasified. In this connection I might mention that where, for example, the capacity of the system is a flow of say 500 gallons per minute, the dehydrating and degasifying equipment is operating from 10% to 50% of the full circulating rate of the system, for example, or, in other words, the lubricant is being dehydrated and degasified continuously at a rate of from 50 to 250 gallons per minute.

Figure 2:
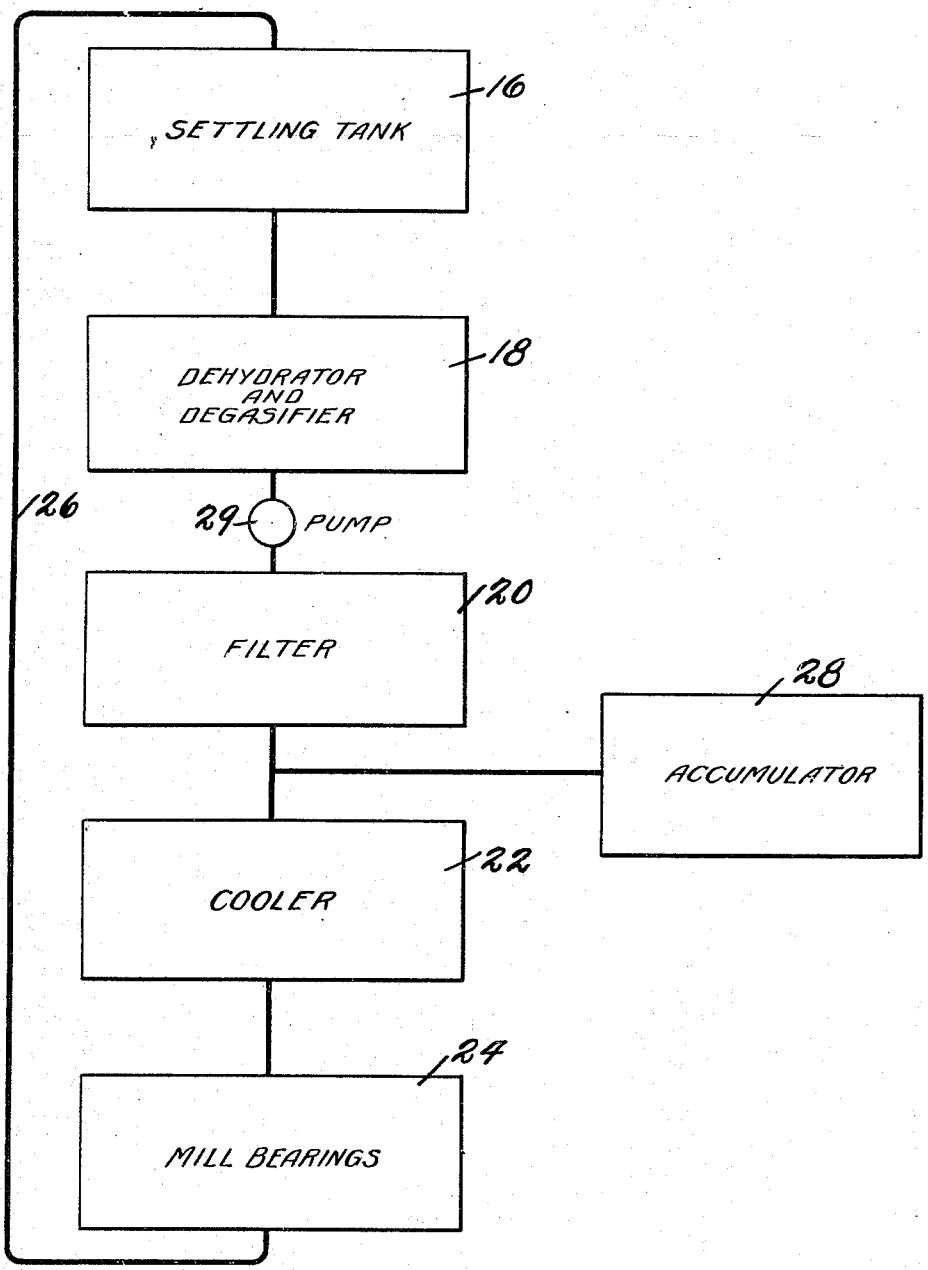
Fig. 2 is a flow sheet showing the dehydrator and degasifier connected in series with the settling tank.

Referring now to the flow sheet of Fig. 2: My improved system there illustrated comprises a settling tank 16, dehydrator and degasifier 18, filter 20 and cooler 22, which may be of the construction referred to in connection with Fig. 1, all connected in series with each other and with the bearings 24 to be lubricated. Return line 26 constantly returns all of the lubricant passing through the bearings to the settling tank 16. An accumulator 28, for example, maintains the system under pressure. Circulation of the lubricant is effected by pump 29.

The system illustrated in this flow sheet, therefore, differs from that of Fig. 1 in that all of the lubricant is continuously circulated through the dehydrator and degasifier 18 instead of by-passing a part of the lubricant as in the case of the flow sheet of Fig. 1. In other words, assuming that the full rate of flow through the system illustrated in this flow sheet is 500 gallons per minute, the dehydrator and degasifier is dehydrating and degasifying the lubricant at this rate.

Figure 3:
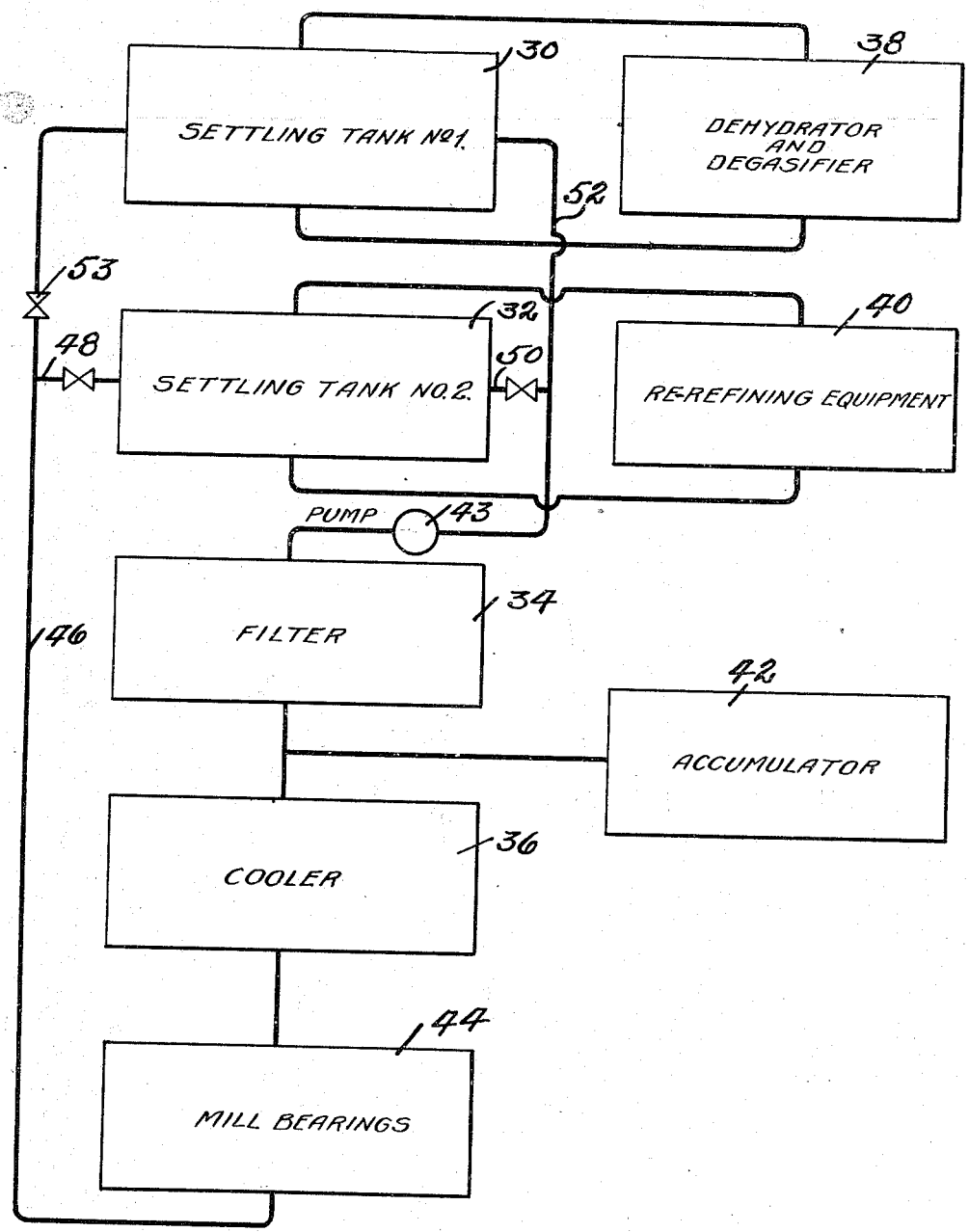
Fig. 3 is a flow sheet showing two settling tanks, a dehydrator and degasifier being connected to one tank and a re-refining equipment to the other.

Referring to the flow sheet illustrated in Fig. 3: It will be seen that in this embodiment of my invention I have provided settling tanks 30 and 32, a filter system 34 and cooler 36. Connected across the settling tank 30 is a dehydrating and degasifying equipment 38 which may be the same, for example, as that of Rodman and Dunmire Patent No. 1,836,338. As explained in connection with the embodiment of my invention illustrated in Fig. 1, this dehydrating and degasifying equipment will have a capacity, for example, from 10 to 50% of the full circulating rate of the system. Connected across the settling tank 32 is re-refining equipment 40, such as disclosed in my Patent No. 2,273,846, issued February 24, 1942, and comprises briefly the process of re-refining oil by the combined action of distillation and adsorption while mechanically agitating the same.

The filter and cooler 34 and 36, respectively, may be of the types referred to in the embodiments of my invention as described in connection with Figs. 1 and 2.

An accumulator 42 or other suitable means is employed for maintaining the system under pressure, and circulation of the lubricant is effected by pump 43.

The bearings to be lubricated are designated 44. The return line from the bearings is designated 46 and leads from the bearings to the settling tank 30, a valve-controlled tap-off being provided at 48 for the tank 32.

At 50 I provide a valve-controlled connection to the line 52 which leads from the settling tank 30 to the filter 34.

With the valve-controlled tap-off 48 and the connection 50 closed, and connections 52 and 53 open, it will be appreciated that all of the lubricant from the bearings 44 passes to the settling tank 30, part of the lubricant passing continuously through the dehydrating and degasifying apparatus 38 and returning to the settling tank again, all of the lubricant passing continuously from this settling tank through the filter 34, cooler 36 and back to the bearings 44. Part of the lubricant being circulated can be re-refined by the re-refining equipment 40 as desired simply by opening the valves in the connections 48 and 50.

It is also understood that by means of suitable pipe connections and valves that the dehydrator 38 and re-refiner 40 may be connected to either settling tank 30 or 32 at any time and may be operated in parallel.

Figure 4:
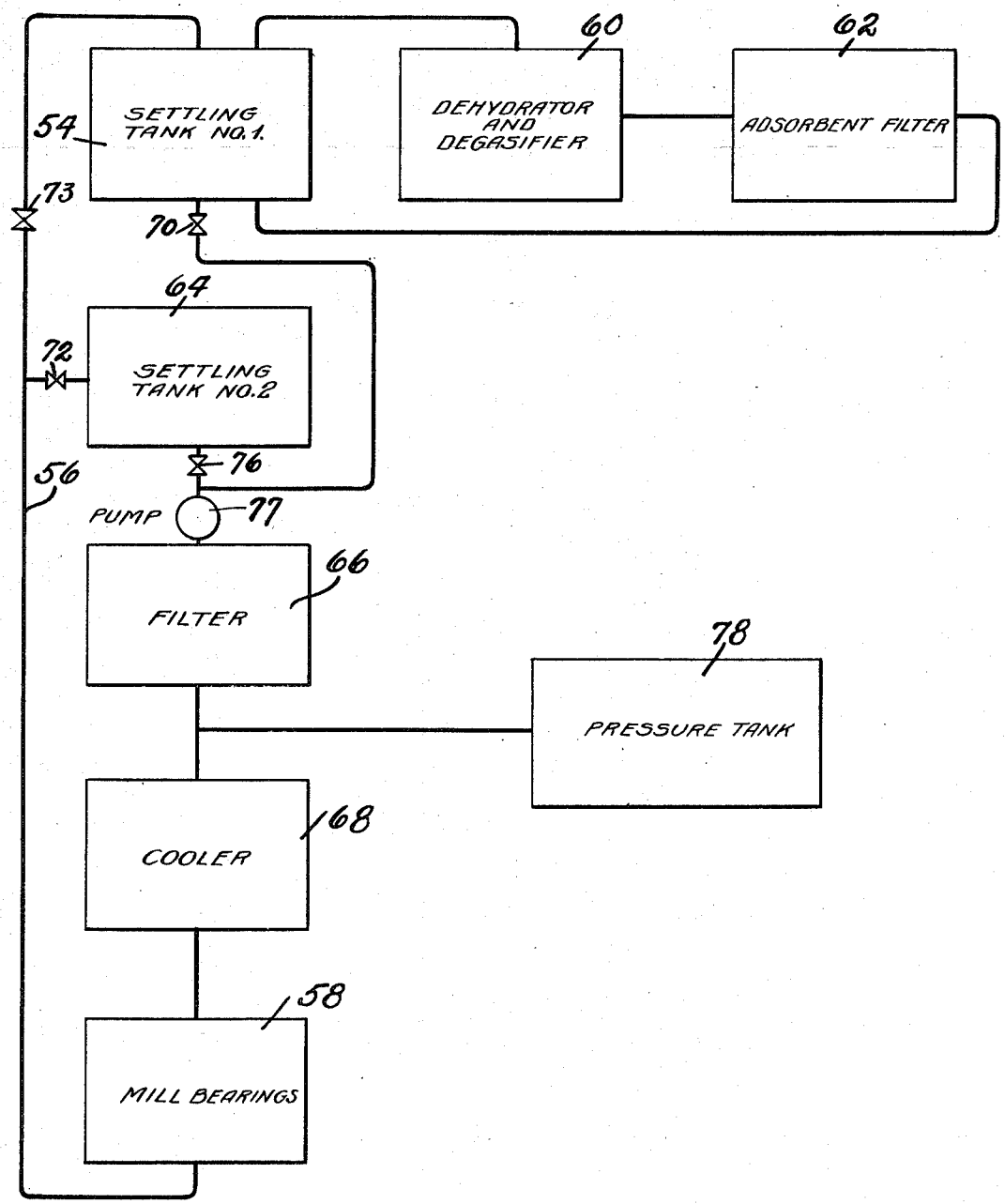
Fig. 4 is a flow sheet in which two settling tanks are employed and in which a dehydrator and degasifier and a re-refining system are connected in series with each other and across one of the settling tanks.

In the embodiment of my invention illustrated in the flow sheet of Fig. 4 I employ an arrangement somewhat similar to that of Fig. 3 in that dehydrating and degasifying as well as re-refining equipment are employed in this embodiment of my invention.

54 designates a settling tank which is in direct communication, through line 56, with the bearings 58 to be lubricated. Connected across the settling tank 54 is a dehydrating and degasifying equipment 60 such as the dehydrating and degasifying equipment of Rodman and Dunmire Patent No. 1,836,338 as well as re-refining equipment 62 which may be the same as that shown at 40 in Fig. 3, or I may employ adsorbent filters. The dehydrator and re-refining equipment are connected in series and the two connected across the settling tank 54 so that there is a continuous flow of lubricant from the settling tank through the dehydrating and degasifying apparatus 60, through re-refining equipment 62, back to the tank 54 again.

In this embodiment of my invention, in addition to the settling tank 54, I employ a settling tank 64. The tanks 54 and 64 are both disposed in series with a filter 66, cooler 68 and the bearings 58. Valve-controlled connections 70, 72, 73 and 76 are provided whereby the flow of lubricant and treatment of the same may be selectively controlled. For example, if the valve-controlled connections 70 and 73 are closed and connections 72 and 76 opened, then all of the lubricant will be circulated in a closed circuit including the bearings 58, settling tank 64, filter 66 and cooler 68. Pressure is maintained in the system by pressure device 78 which may be an accumulator, for example, and circulation effected by pump 77.

With the valves 70 and 73 throttled and 72 and 76 open, a portion of the lubricant will pass to the settling tank 54, through dehydrating and degasifying equipment 60 and re-refining equipment 62 and back to the tank 54, the lubricant passing from thence to the filter 66, cooler 68 and bearings 58, the remainder of the lubricant merely being treated in the settling tank 64 and then passing through the filter and cooler 66 and 68, respectively.

It will be seen from all of the foregoing that the present invention provides a lubricating system adapted for the circulation of lubricant in a closed circuit, means being provided whereby the oil is settled to remove some of its impurities, dehydrated and degasified for the removal of water and gases, filtered and cooled and returned to the mill bearings, some embodiments of my invention providing for the re-refining of the lubricant after it has been dehydrated and degasified. Not only does this provide for a saving in lubricant, as well as a great saving in power, but it insures also that clean lubricant will be supplied at all times to the bearings thereby reducing bearing wear and avoiding shutdowns from bearing failures.

As above pointed out, the specific apparatus employed in the practice of my invention has not been illustrated or described in detail with the exception of the dehydrating and degasifying equipment and the re-refining equipment, the one being, for example, equipment such as disclosed in Rodman and Dunmire Patent No. 1,836,338 and the other equipment such as disclosed in my Patent No. 2,273,846, issued February 24, 1942.

It is to be understood that the layouts above described may be changed or varied without departing from the spirit and scope of my invention.

What I claim is:

1. In an oil purifying system for lubricating a bearing including a first and a second closed circuit having a reservoir common to both of the circuits, the process of supplying a dehydrated, degasified and filtered oil to the bearing, comprising the steps of circulating a portion of the oil through the first closed circuit including the common reservoir, dehydrating and degasifying the oil circulated through the first closed circuit to maintain the oil in the common reservoir in a dehydrated and degasified condition, forcibly and continuously circulating the oil through the second closed circuit including the bearing and the common reservoir and thereby causing the oil forcibly and continuously circulated through the second closed circuit to pick up dehydrated and degasified oil from the first closed circuit in the common reservoir, the continuous circulation of the oil in the second closed circuit being always maintained and being free of disturbance by the operation of the first closed circuit to insure a continuous supply of the oil to the bearing, and filtering and cooling the oil circulated through the second closed circuit in advance of the bearing to insure freedom from solid impurities and to maintain the bearing cool.

2. In an oil purifying system for lubricating a bearing including a first and a second closed circuit having a reservoir common to both of the circuits, the process of supplying a dehydrated, degasified and filtered oil to the bearing, comprising the steps of circulating a portion of the oil through the first closed circuit including the common reservoir, dehydrating and degasifying the oil circulated through the first closed circuit to maintain the oil in the common reservoir in a dehydrated and degasified condition, forcibly and continuously circulating the oil through the second closed circuit including the bearing and the common reservoir and thereby causing the oil forcibly and continuously circulated through the second closed circuit to pick up dehydrated and degasified oil from the first closed circuit in the common reservoir, the continuous circulation of the oil in the second closed circuit being always maintained and being free of disturbance by the operation of the first closed circuit to insure a continuous supply of the oil to the bearing, and filtering and cooling the oil circulated through the second closed circuit in advance of the bearing to insure freedom from solid impurities and to maintain the bearing cool, withdrawing a portion of the oil from the second closed circuit subsequent to filtration and holding the withdrawn oil as a stand-by supply for introduction to the bearing upon cessation of the said forcible circulation of the oil through the second circuit.

3. In an oil purifying system for lubricating a bearing including a first and a second closed circuit having a reservoir common to both of the circuits, the process of supplying a dehydrated, degasified and re-refined oil to the bearing, comprising the steps of circulating a portion of the oil through the first closed circuit including the common reservoir, dehydrating, degasifying and re-refining the oil circulated through the first closed circuit to maintain the oil in the common reservoir in a dehydrated, degasified and re-refined condition, forcibly and continuously circulating the oil through the second closed circuit including the bearing and the common reservoir and thereby causing the oil forcibly and continuously circulated through the second closed circuit to pick up dehydrated, degasified and refined oil from the first closed circuit in the common reservoir, the continuous circulation of the oil in the second closed circuit being always maintained and being free of disturbance by the operation of the first closed circuit to insure a continuous supply of the oil to the bearing, and filtering and cooling the oil circulated through the second closed circuit in advance of the bearing to insure freedom from solid impurities and to maintain the bearing cool.

4. In an oil purifying system for lubricating a bearing including a first and a second closed circuit having a first reservoir common to both of the circuits and a second reservoir included in the second circuit, the process of supplying a dehydrated, degasified and re-refined oil to the bearing, comprising the steps of circulating a portion of the oil through the first closed circuit including the first reservoir, dehydrating, degasifying and re-refining the oil circulated through the first closed circuit to maintain the oil in the first reservoir in a dehydrated, degasified and re-refined condition, forcibly and continuously circulating the oil through the second closed circuit including the bearing and the first reservoir and thereby causing the oil forcibly and continuously circulated through the second closed circuit to pick up dehydrated, degasified and refined oil from the first closed circuit in the common reservoir, the continuous circulation of the oil in the second closed circuit being always maintained and being free of disturbance by the operation of the first closed circuit to insure a continuous supply of the oil to the bearings, filtering and cooling the oil circulated through the second closed circuit in advance of the bearing to insure freedom from solids impurities and to maintain the bearing cool, and short circuiting the second closed circuit to exclude the first reservoir and to include the second reservoir to establish a filtering closed circuit for filtering the oil supplied to the bearing to enable dehydration, degasification and refining of the oil in the first reservoir to be accomplished independently of the oil flowing through the second reservoir and the filtering closed circuit.

5. In an oil purifying system for lubricating a bearing including a first, a second and a third closed circuit having a first reservoir common to the first and second closed circuit and a second reservoir common to the second and third closed circuit, the process of supplying a dehydrated, degasified and re-refined oil to the bearing, comprising the steps of circulating a portion of the oil through the first closed circuit including the first common reservoir, dehydrating and degasifying the oil circulated through the first closed circuit to maintain the oil in the first common reservoir in a dehydrated and degasified condition, circulating a portion of the oil through the third closed circuit including the second common reservoir, re-refining the oil circulated through the third closed circuit to maintain the oil in the second common reservoir in a re-refined condition, forcibly and continuously circulating the oil through the second closed circuit including the bearing and the first reservoir and thereby causing the oil forcibly and continuously circulated through the second closed circuit to pick up dehydrated and degasified oil from the first closed circuit in the first common reservoir, short circuiting the second closed circuit to exclude the first common reservoir and to include the second common reservoir and thereby causing the oil forcibly and continuously circulated through the short circuited second closed circuit to pick up re-refined oil from the third closed circuit in the second common reservoir, the continuous circulation of the oil in the second closed circuit or in the short circuited second closed circuit being always maintained and being free of disturbance by the operation of the first and the third closed circuits to insure a continuous supply of the oil to the bearing, filtering and cooling the oil circulated through the second closed circuit in advance of the bearing to insure freedom from solid impurities and to maintain the bearing cool.

6. In an oil purifying system for lubricating a bearing including a first and a second closed circuit having a reservoir common to both of the circuits, the process of supplying a re-refined and filtered oil to the bearing, comprising the steps of circulating a portion of the oil through the first closed circuit including the common reservoir, re-refining the oil circulated through the first closed circuit to maintain the oil in the common reservoir in a re-refined condition, forcibly and continuously circulating the oil through the second closed circuit including the bearing and the common reservoir and thereby causing the oil forcibly and continuously circulated through the second closed circuit to pick up re-refined oil from the first closed circuit in the common reservoir, the continuous circulation of the oil in the second closed circuit being always maintained and being free of disturbance by the operation of the first closed circuit to insure a continuous supply of the oil to the bearing, and filtering and cooling the oil circulated through the second closed circuit in advance of the bearing to insure freedom from solid impurities and to maintain the bearing cool.

RUSSELL P. DUNMIRE.